United States Patent Office 3,479,228
Patented Nov. 18, 1969

3,479,228
PROCESS FOR THE PREPARATION OF ELECTRODE MATERIAL FROM NICKEL SALT AND BORON CONTAINING COMPOUND
Jean Foucry, Montlhery, France, assignor to Compagnie Generale d'Electricite, Paris, France, a corporation of France
No Drawing. Filed May 26, 1964, Ser. No. 370,370
Claims priority, application France, June 7, 1963, 937,377
Int. Cl. H01m 43/04, 13/00
U.S. Cl. 136—120                                 17 Claims

ABSTRACT OF THE DISCLOSURE

The present disclosure relates to a catalytically active mass made from a nickel salt and boric acid or boron oxide. A mixture of the nickel and boron derivatives is heated under hydrogen to between 400° and 500° C., the temperature is lowered to less than 150° C. but above ambient temperature, the hydrogen atmosphere is replaced with a mixture of hydrogen and an inert gas while the temperature of the mass falls to ambient temperature and then an inert gas is passed through the resultant material. A preferred nickel salt used in the preparation is nickel carbonate. The obtained mass may be further treated by mixing it with nickel having a larger particle size than that in the mass and then compressing and sintering the mixture under hydrogen at between 350° and 550° C., the mixture of the originally obtained mass and the nickel containing about 10 to 50% by weight of the originally obtained mass. A hydrogen electrode may be prepared by homogenizing a nickel salt, boric acid or boron oxide and a conductive support material, compressing and heating the obtained mixture under hydrogen at a temperature below 500° C., eliminating excess boric acid or boron oxide, and reheating the compressed mixture under hydrogen.

---

The present invention concerns catalyzers which act on the hydrogenation process, and their applications, particularly in the constitution of catalytic sintered masses.

A prior art method is known which consists in obtaining nickel catalyzers through the decomposition of organic salts of this metal or through the reduction of certain mineral salts by hydrogen. The catalyzers obtained, however, if they are active at more or less high temperatures, have no activity at ambient or lower than ambient temperature, which is not the case for products obtained through reduction in a liquid medium such as Raney nickel or products prepared with hydroborides or hypophosphites.

The present invention has in particular for its object the obtention, by a dry process, of low temperature active hydrogenation catalyzers.

It also has for its object the application of these catalyzers in the preparation of catalytically active sintered masses, in particular a fuel electrode and, preferably, a hydrogen electrode for a fuel cell.

The process, according to the invention, is characterized mainly by the fact that such catalyzers are obtained through treatment of mixtures of basic carbonates or organic salts of nickel and boric acid or boron oxide by means of hydrogen according to a determined thermic cycle.

In a method of application of the invention, the thermic treatment of a mixture of nickel carbonate and boric acid is preferably the following:

Operation is effected in a hydrogen atmosphere. The temperature of the mixture is raised, in the space of 60 to 150 minutes, up to a temperature of between 400 and 500° C. approximately.

This temperature is maintained for about 20 minutes; it is then lowered as rapidly as possible to a temperature which is lower than 150° C. and this in the space of about 10 minutes. At this stage, the hydrogen atmosphere is replaced by a mixture of an inert gas and hydrogen until the temperature returns to the ambient temperature.

As a practical example, the preparation of the following catalyzers may be mentioned, which are in keeping with the invention and are, themselves, only different where a given carbonate is affected by the quantity of boric acid added.

A commercial nickel carbonate may be employed. Pure boric acid may be used therewith.

In all cases, the two products were ground together as finely as possible so that, for example, the mixture passed entirely through a 37 micron mesh screen (AFNOR).

The temperature is raised up to about 460° C. in the space of two hours. It is maintained at this temperature for 20 minutes, then it is rapidly reduced from 460° C. to about 120° C. in the space of 10 minutes.

At this stage, the hydrogen atmosphere is replaced by a hydrogen-argon mixture until the temperature returns to the ambient temperature.

The hydrogen is then totally removed and argon is run through for at least six hours.

Of course, the invention is in no way limited to the described method of operation, which has only been given as an example.

The invention also aims at new products, particularly catalyzers obtained by means of the aforementioned process.

The catalyzers obtained according to the invention are not contaminated by impurities as is the case of products obtained during a liquid phase.

The catalyzer obtained according to the invention is not pyrophoric.

The catalyzer obtained according to the invention is magnetic and is a conductor.

The catalyzer, prepared according to the invention, always contains more than 150 cm.³ of hydrogen per gram.

The specific surface of the catalyzer obtained is always more than 100 m.² per gram.

A measure of catalytic activity may be carried out as follows:

A known quantity of sodium hypophosphate is decomposed in a normal sodium medium at a temperature of 20° C. for a given weight of catalyzer.

The hydrogen displaced is measured as a function of the time and if V is the volume of hydrogen displaced and X is the volume displaced at the time T, the following equation results for a given weight of catalyzer.

$$\log \frac{V}{V-X} = KT$$

K is the characteristic of activity of the catalyzer which is within broad limits proportional to the weight of the catalyzer as a result of its surface.

As an example, the following results may be mentioned:

| Number of atoms of boron for 1 atom of nickel: | K |
|---|---|
| 0 | 0.0030 |
| 0.06 | 0.300 |
| 0.60 | 0.500 |
| 0.80 | 0.625 |
| 0.90 | 0.520 |
| 1.03 | 0.700 |
| 1.40 | 0.500 |

It would not appear that the catalytic activity depends on the amount of boron fixed but that this intervenes through the modification of the crystalline structure obtained. Unfortunately, the very great specific surface obtained does not make it possible, at the present time, to study this structure through diffraction by means of X-rays since the spectra obtained are too diffused.

It would appear that the proportion of boron used depends on the specific surface of the original carbonate and the boric acid, and it is known that, concerning the carbonate, this specific surface can be caused to vary within broad limits.

According to the invention, the catalyzers obtained from basic carbonates or organic salts of nickel and boric acid or boron oxide used in mixtures, consisting of about 50 to 90% of a less finely divided or powdered nickel (ex-carbonyl nickel, for example) and from 50 to 10% of one of these catalyzers, after compression and sintering at above about 550° C. in hydrogen, constitute, after appropriate treatment, actively sintered catalytic masses. These may be used particularly as fuel electrodes for fuel cells, for example, in hydrogen cells.

For purely illustrative and in no way limitative purposes, the following example may be cited of a method of making a hydrogen electrode for a fuel cell.

One uses a mixture of:

80 g. of ex carbonyl nickel
14 g. of nickel carbonate
6 g. of boric acid

The mixture is homogenized until the final product entirely passes through an AFNOR 37 micron mesh screen. The resulting product is compressed in a pill mold under a load of 1500 kg. per cm.$^2$. The electrode obtained is heated in hydrogen at a rate of 300° C. per hour up to about 500° C. This is left to cool in this atmosphere and the electrode is collected in water taking care not to expose it to the air. The electrode is washed in 5 N potassium hydroxide until complete disappearance of excess boron, then in water until disappearance of alkalinity and, finally, in acetone. Drying is effected at the ambient temperature under a vacuum of $10^{-2}$ mm./Hg for about 12 hours. A new pressure of 1500 kg. is applied to the electrode and a new hydrogen treatment is conducted by raising the temperature up to 350° C. in one hour, for example.

The electrode, collected in water or 5 N potassium hydroxide is ready to be mounted in a cell.

I claim:

1. A process for the preparation of a catalytically active mass from a nickel salt which comprises the steps of finely grinding a mixture of boric acid or boron oxide and a nickel salt selected from the group consisting of the basic nickel carbonates and organic salts of nickel, heating the mixture in a hydrogen atmosphere to a temperature of between 400° and 500° C., said temperature being maintained for a short period of time, lowering the temperature rapidly to less than 150° C. but above ambient temperature, and then replacing the hydrogen atmosphere with a mixture of hydrogen and an inert gas until the temperature descends to ambient temperature, whereafter the supply of hydrogen is interrupted and an inert gas is passed through the resulting material.

2. The process of claim 1, wherein said heating step is carried out over a period of from 60 to 150 minutes and wherein said mixture is maintained at between 400° and 500° C. for about twenty minutes.

3. The process of claim 2, wherein the temperature of the mixture is lowered to less than 150° C. over a period of about ten minutes.

4. The process of claim 3, wherein the inert gas is passed through the finally resulting material for at least six hours.

5. The process of claim 1, wherein the mixture is heated to about 460° C.

6. The process of claim 1, wherein the components of said mixture are ground to a size where they will pass through a screen having a mesh size of 37 microns.

7. The process of claim 1, wherein the proportion of active boron is, at most, 1.40 atoms of boron per 1 atom of nickel.

8. A process for the preparation of a catalytically active mass from a nickel salt which comprises the steps of finely grinding a mixture of boric acid or boron oxide and a nickel salt selected from the group consisting of the basic nickel carbonates and organic salts of nickel, heating the mixture in a hydrogen atmosphere to a temperature of between 400° and 500° C., said heating step being carried out over a period of from 60 to 150 minutes and the said temperature being maintained for about twenty minutes, lowering the temperature rapidly to less than 150° C. but above ambient temperature, the said lowering of temperature being carried out over a period of about ten minutes, and replacing the hydrogen atmosphere with a mixture of hydrogen and an inert gas until the temperature descends to ambient temperature, whereafter the supply of hydrogen is interrupted and an inert gas is passed through the resulting material for at least six hours, the obtained product then being mixed with nickel which is in a less finely divided state than the nickel in said obtained product and being compressed and sintered under hydrogen at a temperature of between 350° and 550° C., the mixture of said obtained product and said nickel containing substantially 10 to 50% by weight of said product.

9. The process of claim 8, wherein the mixture of said obtained product and said nickel contains substantially 30% by weight of said product and 70% by weight of said nickel.

10. A process for the preparation of a hydrogen electrode for a fuel cell which comprises the steps of homogenizing a mixture of boric acid or boron oxide, a nickel salt selected from the group consisting of the basic nickel carbonates and organic salts of nickel and a conductive support of ex-carbonyl nickel, compressing and heating the obtained mixture under a hydrogen atmosphere at a temperature below 500° C., eliminating the excess boric acid or boron oxide, and reheating the compressed mixture under a hydrogen atmosphere.

11. The process of claim 10, wherein the compressed mixture is dried and recompressed after the excess boric acid or boron oxide has been eliminated but before the mixture is reheated.

12. The process of claim 10, wherein the mixture is homogenized until it is small enough to pass through a screen having a mesh size of 37 microns.

13. The process of claim 10, wherein the pressure used during said compressing step is about 1500 kg./cm.$^2$ and the first heating under a hydrogen atmosphere comprises raising the temperature to about 500° C. at a rate of about 300° C. per hour.

14. The process of claim 10, wherein the elimination of excess boric acid or boron oxide is carried out by washing with potassium hydroxide, excess potassium hydroxide being eliminated by washing with water.

15. The process of claim 14, wherein, after elimination of excess potassium hydroxide, a washing with acetone is effected, followed by drying at ambient temperature under vacuum for a sufficient time.

16. The process of claim 10, wherein, after elimination of excess boric acid or boron oxide, the compressed product is recompressed at a pressure of about 1500 kg./cm.$^2$ and is heated under a hydrogen atmosphere to about 350° C. in about one hour.

17. The process of claim 16, wherein, after said heating treatment to about 350° C., the recompressed product is collected in water or potassium hydroxide.

References Cited

UNITED STATES PATENTS

| | | | |
|---|---|---|---|
| 1,255,590 | 2/1918 | Ellis | 252—432 |
| 1,338,709 | 5/1920 | Sulzberger | 252—432 |
| 2,137,101 | 11/1938 | Spicer | 252—432 |

WINSTON A. DOUGLAS, Primary Examiner

A. SKAPARS, Assistant Examiner

U.S. Cl. X.R.

136—29; 208—114; 252—432